Figure 1:
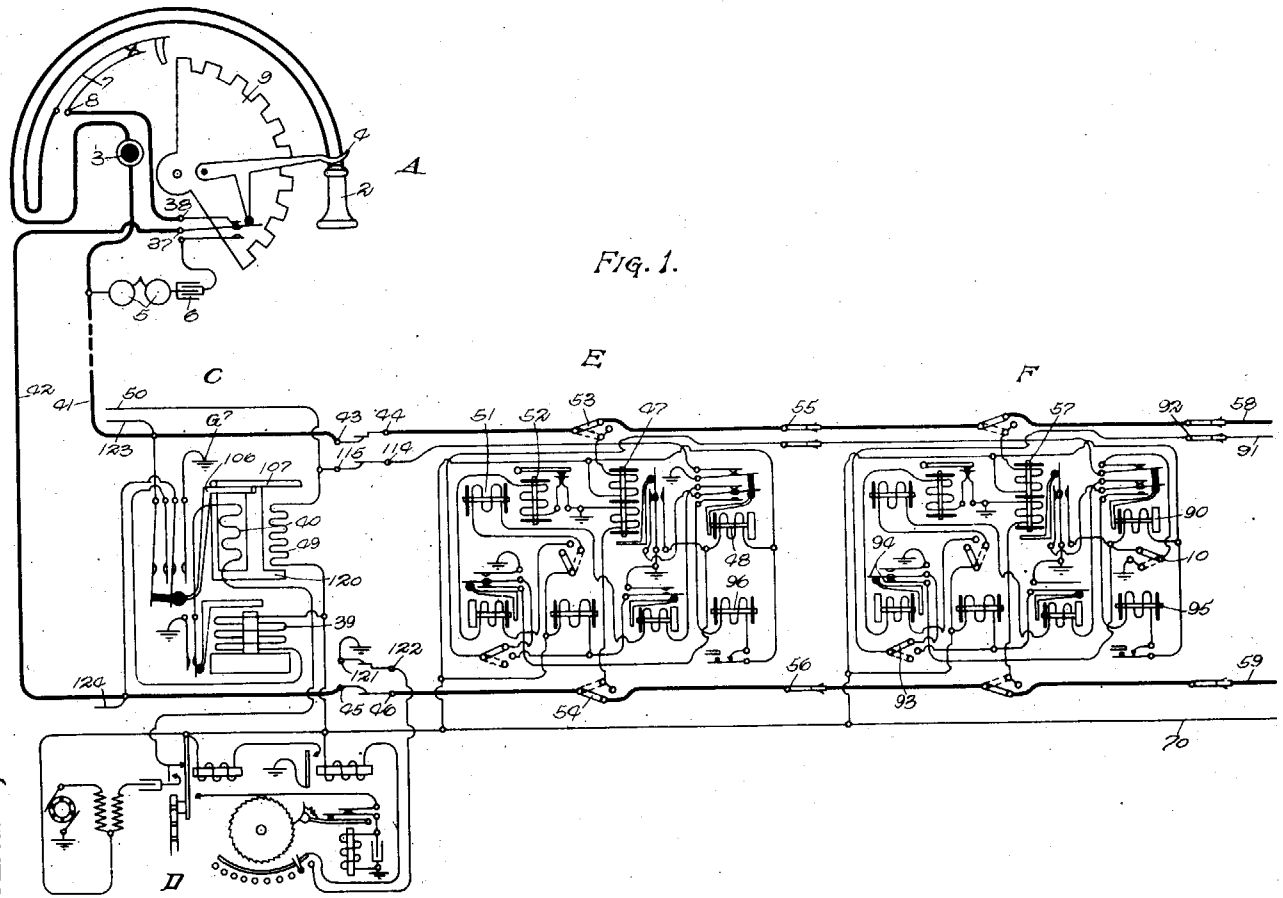

F. NEWFORTH, Jr.

AUTOMATIC TELEPHONE SYSTEM.

APPLICATION FILED AUG. 24, 1914.

Reissued Apr. 13, 1915.

13,901.

2 SHEETS—SHEET 1.

WITNESSES

G. Yanchowski.

Herbert W. Kracke

INVENTOR:

FRANK NEWFORTH, JR.

By Bulkley & Swenston

ATTORNEYS

F. NEWFORTH, JR.

AUTOMATIC TELEPHONE SYSTEM.

APPLICATION FILED AUG. 24, 1914.

Reissued Apr. 13, 1915.

13,901.

2 SHEETS—SHEET 2.

WITNESSES

G. Ganochowski.

Herbert W. Hacke

INVENTOR.

FRANK NEWFORTH, JR

By Bulkley & Swenarton

ATTORNEYS

UNITED STATES PATENT OFFICE.

FRANK NEWFORTH, JR., OF CHICAGO, ILLINOIS, ASSIGNOR TO AUTOMATIC ELECTRIC COMPANY, OF CHICAGO, ILLINOIS, A CORPORATION OF ILLINOIS.

AUTOMATIC TELEPHONE SYSTEM.

13,901. Specification of Reissued Letters Patent. Reissued Apr. 13, 1915.

Original No. 1,078,690, dated November 18, 1913, Serial No. 671,692. Application for reissue filed August 24, 1914. Serial No. 858,364.

*To all whom it may concern:*

Be it known that I, FRANK NEWFORTH, Jr., a citizen of the United States of America, and resident of Chicago, Cook county, Illinois, have invented a certain new and useful Improvement in Automatic Telephone Systems, of which the following is a specification.

My invention relates to an improved telephone system, and more particularly to a system in which automatic selecting and connecting switches are employed for establishing a connection between a calling and a called subscriber's line.

Heretofore, in such systems, it has been found advisable and necessary to have the normal conductors—that is, the conductors by means of which the connector bank contacts are connected with the line conductors—terminate in normally open contacts in the cut-off relay of the line switch instead of being permanently connected with the line conductors. This was necessary for the reason that very often when connection is completed with the line ringing current is projected over the normals before the cut-off relay of the line switch has had time to disconnect the line relay from the line, and if the normals were permanently connected with the line, this ringing current would energize the line relay of the line switch of the called line and cause it to operate.

It is one of the objects of my present invention to provide means which will enable the normals to be permanently connected with the line and yet prevent any possibility of ringing current being projected over the called line before its line relay is disconnected therefrom. This is accomplished in the present instance by providing means whereby the connection between the calling and the called lines is not completed until a predetermined interval after the line relay has been disconnected from the called line. This new construction is of practical advantage not alone in the saving of a number of springs at each line switch, but likewise in the fact that it saves considerable wire and labor in wiring up each line switch board.

Another new feature of my invention is the provision of means whereby the back-bridge relay of the connector is energized upon the response of the called subscriber for the purpose of reversing the battery connections to the calling line at the connector. This reversal of battery in the calling line may be used to advantage for operating call registers or operators' signals, and is likewise useful for the purpose of insuring a positive release of the connector in the manner more specifically hereinafter pointed out.

These and other objects and features of my invention will be more clearly understood by reference to the following description, in which the complete operation of a system embodying the features of my invention is particularly described.

Figure 2:
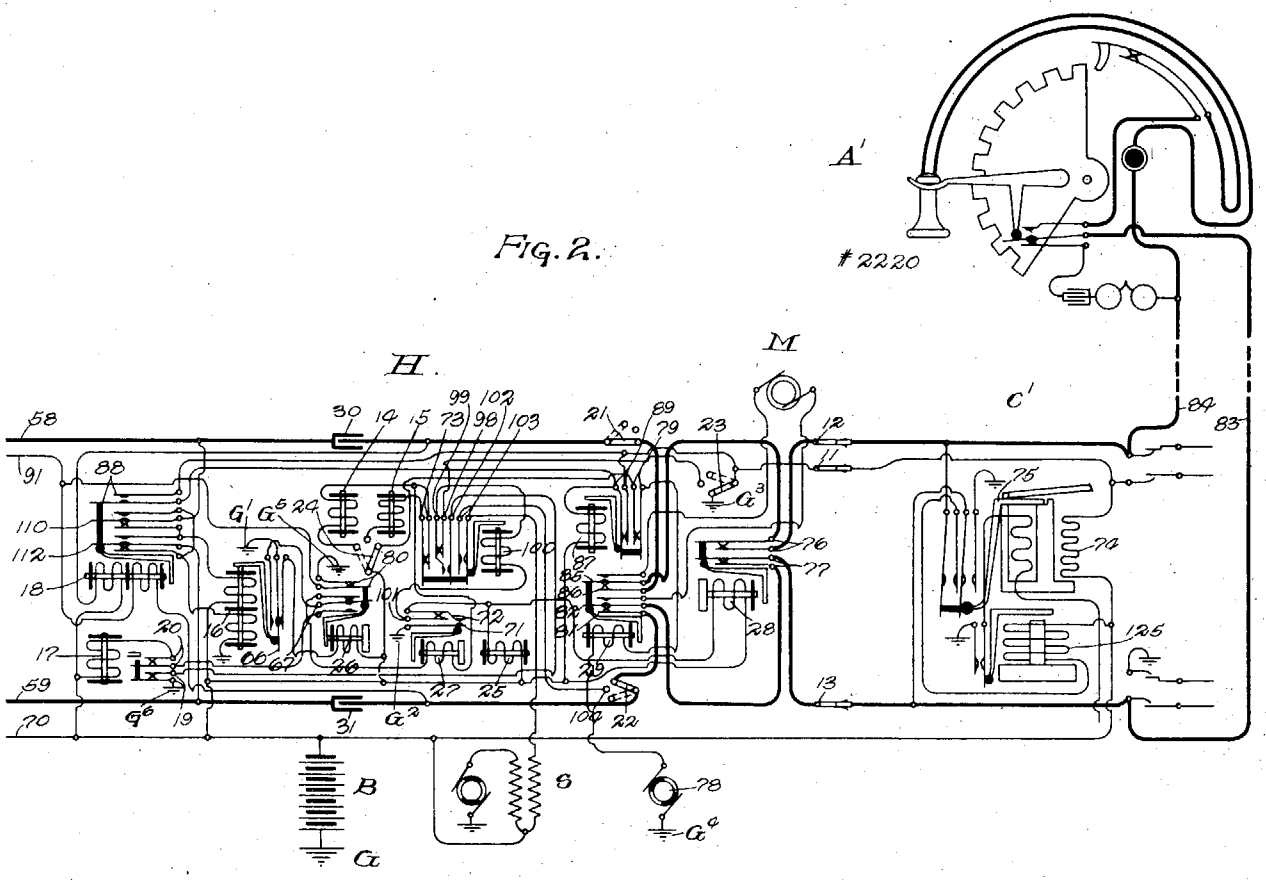

In the accompanying drawings Figures 1 and 2 taken together show a complete circuit connection between a calling substation A and a called substation A′ in a system embodying the principles of my invention.

The automatic telephone system represented herein is of the well-known type of system embodying subscribers' individual or line switches, selectors and connectors, the connection shown being established through the medium of a line switch C, first selector E, second selector F and connector H. As shown herein, the substation A comprises the usual receiver 2, transmitter 3, switch hook 4, ringer 5 and condenser 6. Being an automatic substation, it is also provided with an automatic calling device. This calling device may be of the type shown in British patent to S. G. S. Dicker No. 29,654 of 1910. In the drawings, however, the calling device is represented diagrammatically by a pair of impulse springs 7 and 8 and a toothed impulse wheel 9, which impulse wheel may be controlled by the subscriber through the medium of a dial (not shown) provided with finger holes. The mechanism is so arranged that as the dial and impulse wheel are rotated forward by the subscriber, the impulse springs are not operated; but as the dial and impulse wheel return to normal position, the springs are separated momentarily a number of times corresponding to the digit called.

The line switch C is of the general type of line switch shown in British patent to R. W. James No. 26,301 of 1906, the particular form shown, however, being similar to that shown in British patent to T. G. Martin No. 1419 of 1910, with the exception that the line relay and operating magnet are made separate instead of being combined in a single structure. Among other details, the line switch comprises a plunger (not shown) carried upon the end of the plunger arm 107 which is adapted, when the plunger arm is attracted by the magnet 120, to be thrust into some one of a plurality of groups of contact springs 43, 44, 45, 46, 115, 114, 121 and 122, to force them into contact in pairs as indicated. The magnet 120 also controls the cut-off armature 106 and comprises two windings 40 and 49. The winding 40 is strong enough to operate the plunger arm 107. The winding 49 is not strong enough to attract the plunger arm from its normal position, but is strong enough to attract the armature 106 and to hold the plunger arm 107 down after it has once been operated. The line relay 39 is slow acting—that is, slow to deënergize—so that it may keep the operating winding 40 energized for a short time after the cut-off armature 106 has operated to disconnect said line relay 39 from the line. As shown herein, the conductors 123 and 124, by means of which the connector bank contacts are connected with the line, are permanently connected with the line conductors instead of one or both of them being adapted to be connected with the line through normally open contacts controlled by the cut-off armature 106, as has been the general practice heretofore.

The master switch D is of the general type of master switch disclosed in British patent to R. W. James No. 26,301 of 1906, above referred to, but is of the particular form shown in said British Patent No. 1419 of 1910 issued to T. G. Martin.

The selector E is of the general type of selector switches shown in United States Letters Patent No. 815,321, issued to Keith, Erickson and Erickson March 13, 1906, the circuits being modified, however, as shown in British Patent No. 1419 of 1910 above referred to, in order to operate in a system in which the central office apparatus is controlled by the calling subscriber over the two sides of the line in series.

The second selector F is similar to the first selector E, with the addition of the side switch wiper 16.

As the construction and operation of the line and master switches and the selectors are in general well known, and are fully described in the publications above referred to, it is not thought necessary to describe the same in detail herein.

The connector H (Fig. 2) is of the general type of connector switch disclosed in United States Letters Patent No. 815,176, issued March 13, 1906, to Keith, Erickson and Erickson, the circuits being modified, however, in order to operate in a two-wire system. As shown herein, the connector is assumed to be provided with a bank of contacts arranged in horizontal rows or levels, which contacts are adapted to be engaged by a set of wipers 11, 12 and 13 carried upon a vertically and rotatably movable shaft which is controlled by the vertical and rotary operating magnets 14 and 15. The operations of the switch are controlled by the calling subscriber through the medium of the double-wound relay 16, which relay is connected with the line circuit through the springs of the so-called back-bridge relay 18. The usual means for releasing the switch shaft to permit it to be restored to normal position are provided in the release magnet 17. The usual side switch comprising the wipers 21, 22, 23 and 24 is controlled by the private magnet 25 in the usual manner. Three relays 26, 27 and 28 are likewise provided. These relays 26, 27 and 28 are slow acting relays—that is, relays which deënergize slowly after their energizing circuits have been broken. The relay 29 is the usual ringing relay for applying ringing current to the called line for signaling purposes. The talking circuit through the connector is divided into two inductively connected sections by the condensers 30 and 31. The springs 19 and 20 are controlled by the switch shaft in such a manner that they are permitted to close only when said shaft is raised one or more steps from its normal position.

At M there is shown a ringing current generator and at S a busy signaling machine is represented for supplying the usual interrupted busy signaling current. At B there is shown a battery having one terminal grounded at G for supplying current for operating the central office apparatus and for talking purposes. The line switch C′ and substation A′ are in all respects the same as the line switch C and the substation A.

A general description of the apparatus having been given, it will now be explained how the connection is extended from the calling to the called substation.

When the receiver at the substation A is removed from the switch hook preparatory to making a call, the engagement of the hook switch springs 37 and 38 completes a bridge across the line through the receiver and transmitter at the substation. The closure of this bridge across the line establishes an energizing circuit for the line relay 39 of the line switch C. The relay 39, upon energizing, operates to close the circuit of the operating winding 40 of the magnet 120, which, upon energizing, attracts the plunger arm 107 and cut-off armature 106, whereby the line conductors 41 and 42 are extended through the line switch bank springs 43 and 44 and 45 and 46 to the selector E, and the line relay 39 is disconnected from the line. When the connection is extended to the selector E, its line relay 47, which is normally bridged across the line circuit of the switch in series with the battery, becomes energized and operates to close the circuit of the relay 48. The relay 48, upon energizing, operates to close the circuit of the holding winding 49 of the line switch C before the line relay 39 breaks the circuit of the operating winding 40, and to extend a guarding ground potential over the conductor 50 to the connector private bank contacts of the calling line.

When the substation calling device is operated for the first digit of the called number, which will be assumed to be 2220, the substation impulse springs 7 and 8 are separated twice momentarily, thereby causing the selector line relay 47 to be twice momentarily deënergized. Each time the relay 47 deënergizes, it closes a circuit through the vertical magnet 51. Since the digit called is 2, the vertical magnet 51 operates twice to raise the switch shaft and its wipers two steps, after which the side switch passes to second position and causes the rotary magnet 52 to operate in the usual manner to rotate the shaft wipers onto the contacts of an idle trunk line leading to a second selector F. The side switch thereupon passes to third position and, through the medium of its wipers 53 and 54, disconnects the line relay 47 from the line circuit and extends the line conductors through the shaft wipers 55 and 56 and the contacts upon which they have been rotated to the second selector F. The line relay 57 of the second selector thereupon becomes energized in the same manner in which the line relay of the first selector was energized when connection was first extended to it.

When the substation calling device is operated for the second digit 2 of the called number, the selector F operates in the same manner as explained for the selector E in connection with the previous digit to extend the connection over the trunk conductors 58 and 59 to an idle connector H which has access to the group of lines to which that of the substation A′ belongs. When the connection is thus extended to the connector H, its line relay 16, which is normally bridged across the conductors 58 and 59 in series with the battery, becomes energized. The relay 16, upon energizing, closes the circuit of the relay 26. When the calling subscriber operates his calling device for the third digit 2 of the called number, the circuit of the line relay 16 of the connector is broken twice momentarily. The relay 26 being a slow acting relay does not have time to deënergize during the momentary interruptions of its circuit by the line relay, and, therefore, each time the relay 16 deënergizes, a circuit is closed from ground G′ through the spring 66 and its back contact, spring 67 and its front contact, relay 27, vertical magnet 14 and the side switch wiper 24 to the battery lead 70, and thence through battery B to ground G. Since the digit called is 2, the vertical magnet receives two impulses over this circuit and operates to raise the switch shaft and wipers 11, 12 and 13 two steps. The relay 27, which is energized in series with the vertical magnet, is a slow acting relay and, upon being energized by the first impulse, remains in its energized position until after the last impulse is delivered to the vertical magnet. The relay 27, upon energizing, completes a circuit extending from ground $G^2$ through the springs 71 and 72 and the private magnet 25 and relay 28 in multiple to the battery lead 70. The relay 27 deënergizes and breaks the circuit of the private magnet 25 and the relay 28 shortly after the last impulse is delivered to the vertical magnet. The private magnet, upon energizing and deënergizing, causes the side switch to pass from first to second position. When the calling subscriber operates his calling device for the last digit 0, the circuit of the line relay 16 is broken ten times. Since the side switch is now in second position, each time the line relay deënergizes a circuit is closed from ground G′ through the spring 66 and its back contact, spring 67 and its front contact, relay 27, springs 73, rotary magnet 15 and the side switch wiper 24 to the battery lead 70. The rotary magnet 15 operates in response to the ten impulses received over this circuit to rotate the switch shaft ten steps to carry the wipers 11, 12 and 13 onto the bank contacts of the desired line No. 2220. The relay 27 is energized in series with the rotary magnet 15 and operates in the same manner as for the previous digit to maintain the circuit of the private magnet 25 and the relay 28 closed during the entire time the rotary magnet is operating. The circuit of the private magnet 25 and the relay 28 is broken shortly after the last impulse is delivered to the rotary magnet, and the private magnet 25, upon deënergizing, permits the side switch to pass to third position. The side switch wiper 23, upon reaching third position, completes a circuit extending from ground $G^3$ through said side switch wiper, shaft wiper 11, connector private bank contacts and the cut-off winding 74 of the switch C′ to the battery lead 70. The winding 74, upon energizing, attracts the armature 75, which operates to disconnect the battery from the line at the switch C′.

The passage of the side switch wipers 21 and 22 to third position and the closing of the contacts 76 and 77 by the deënergization of the relay 28 finally completes the connection between the calling and the called lines. The passage of the side switch wiper 24 to third position completes the circuit of the ringing relay 29. This circuit extends from ground $G^4$ through the interrupter 78, relay 29, spring 79 and the side switch wiper 24 to the battery lead 70. The relay 29, upon energizing, disconnects the calling line from the called line and connects the ringing current generator M with the called line through the ringing relay springs 82 and 85 and their front contacts, contacts 77 and 76 of the relay 28 and the wipers 13 and 12. The relay 28, which controls the contacts 77 and 76, is a slow acting relay and therefore does not permit its contacts to close until shortly after the side switch has passed to third position and closed the circuits of the cut-off winding 74 of the line switch C. It will thus be seen that by the aid of the relay 28 it is impossible for ringing current to be applied to the called line until after the cut-off winding 74 has had sufficient time to energize and disconnect the line relay 125 from the line, thereby preventing any false operation of said relay by the ringing current, notwithstanding the fact that the connector bank contacts are permanently connected with the line instead of through normally open contacts in the cut-off relay of the line switch, as has been heretofore necessary. Since the circuit of the ringing relay 29 includes the interrupter 78, said relay is energized only intermittently so as not to ring the called subscriber continuously. When the called subscriber removes his receiver in response to the call, the talking circuit of the called substation is bridged across the line, and as soon thereafter as the ringing relay 29 deënergizes, said substation is provided with talking current over a circuit extending from ground $G^5$ at the connector release relay 26, through the springs 80, right-hand winding of the back-bridge relay 18, side switch wiper 22, ringing relay springs 81 and 82, springs 77, thence to and through the substation A′ and back over the line 84, wiper 12, spring 76, springs 85 and 86, side switch wiper 21 and the left-hand winding of the back-bridge relay 18 to the battery lead 70. The relay 18, upon energizing, closes the circuit of the relay 87. This circuit extends from ground $G^3$ through the side switch wiper 23, springs 88 and relay 87 to the battery lead 70. The relay 87, upon energizing, operates to open the circuit of the ringing relay 29 at the springs 79 and, by closing contact between the springs 89, forms a locking circuit for itself independent of the relay 18, so as not to deënergize again when the called subscriber hangs up his receiver. The shifting of the springs 110 and 112 by the energization of the relay 18 transposes the connection between the windings of the line relay 16 and the trunk conductors 58 and 59, whereby the direction of the current in the calling line is reversed. This reversal of current is often used for the purpose of operating call registers in the manner shown in British patent to S. G. S. Dicker No. 1298 of 1910. It may also be used to operate supervisory or operators' signals in a manner which is well known in the art. In the drawings the complete talking circuit between the calling and the called lines is outlined by heavy conductors.

After the conversation is completed, the entire connection is released by the hanging up of the receiver at the calling substation. During the time the connection is being maintained, the release relays 90 and 48 of the selectors F and E, respectively, are maintained energized over a circuit extending from ground $G^5$ at the connector through the springs 80, conductor 91, private wiper 92 of the selector F, side switch wiper 93 and the spring 94, whence the circuit branches, one branch passing through the relay 90 to battery, while the other branch passes through the side switch wiper 10 and on to the selector E, and through its relay 48 to the battery lead 70. When the calling subscriber hangs up his receiver, the circuit of the line relay 16 of the connector is broken. The relay 16, upon deënergizing, breaks the circuit of the relay 26. The relay 26, upon deënergizing, closes the circuit of the release magnet 17, said circuit extending from ground $G'$ through the spring 66 and its back contact spring 67 and its back contact, spring 20 and the release magnet 17 to the battery lead 70. The magnet 17, upon energizing, immediately restores the shaft and side switch of the connector to normal position, and the switch shaft, upon reaching its lowest position, separates the springs 20, thereby permitting the release magnet to deënergize. The relay 26, upon deënergizing, also disconnects ground $G^5$ from the back-bridge relay 18 and also breaks the holding circuit of the relays 90 and 48 of the selectors F and E, respectively. The disconnection of ground from the relay 18 permits said relay to deënergize and cause the current in the calling line to be restored to its normal direction, even though the called subscriber has not yet hung up his receiver. The breaking of the circuits of the relays 90 and 48 permits the said relays to deënergize so as to close the circuits of their respective release magnets 95 and 96, which, upon energizing, cause the switches F and E to be restored to normal position. The relay 18, upon deënergizing, also breaks the holding circuit of the holding winding 49 of the switch C, causing said switch to be restored to normal position.

In the foregoing it has been assumed that the line of the substation A′ was idle when called from the substation A. In case said line had been busy, the connector H would not have completed connection therewith, and the calling subscriber would have been given a busy signal in the following manner: Whenever a line is busy, either on account of having made a call or on account of having been called, there is a guarding ground potential upon its connector private bank contacts. When the wipers of a connector are rotated onto the contacts of a busy line, a ground potential is extended from the grounded private bank contact of said line through the private wiper 11, side switch wiper 23 (which is then in second position), springs 98 and 99 and the relay 100 to the spring 101 of the private magnet relay 27. When the relay 27 deënergizes after the last impulse for the last digit is delivered, it permits the spring 72 to engage the spring 101 before the springs 72 and 71 separate, whereby the ground potential applied to the spring 101 from the guarded contact of the busy line provides a holding circuit for the private magnet 25 and does not permit it to deënergize, while at the same time the relay 100 becomes energized in series with the private magnet. Since the private magnet 25 does not deënergize after the last digit is called, the side switch remains locked in second position and no connection is completed between the calling line and the busy called line. The relay 100, upon energizing, transfers the locking ground for itself and the private magnet from the guarded private bank contact of the busy line to ground $G^6$ by way of the springs 19, 102 and 99. The relay 100, upon energizing, also completes a connection from the busy signaling machine S through the springs 103, contact 104 and the side switch wiper 22 to the calling line to notify the calling subscriber that the called line is busy. After having called a busy line, the switches are released by the hanging up of the receiver at the calling substation in the same manner as if an idle line had been called.

In the foregoing description it has been explained how the battery connection with the calling line through the connector line relay, which is reversed upon the response of the called subscriber, is restored to its normal position as a result of the hanging up of the receiver at the calling substation if the called subscriber has not yet hung up his receiver. This feature has no particular function in the connection shown in the drawings, in which the connection is extended from the line switch C to the connector H through the medium of selector switches E and F. In an exchange of a smaller capacity, however, or in a small branch exchange in which selector switches are not used—that is, where the trunk lines to which the line switches have access lead directly to connector switches—the trunk conductor 91 (Fig. 2) would be connected to the line switch bank spring 114. In such a case the holding circuit for the holding winding 49 of the switch C would extend from ground $G^5$ at the connector through the springs 80, conductor 91, line switch bank springs 114 and 115 and the winding 49 to the battery lead 70. Thus the circuit of the winding 49 of the switch C would be broken immediately upon the deënergization of the relay 26 of the connector H when the calling subscriber hung up his receiver and before the connector had time to release. It has been found that sometimes when the holding winding 49 of the line switch C deënergizes, the cut-off armature 106 falls back and permits the line winding 39 and ground $G^7$ to be connected with the calling line before the plunger arm 107 has fallen back far enough to permit the plunger to be withdrawn from the bank sufficiently to disconnect the line from the connector. If the connector back-bridge relay 18 is controlled entirely by the called subscriber, and the called subscriber has not yet hung up his receiver when this occurs, the ground at the line switch will be connected to the same side of the line which is connected to the non-grounded terminal of the battery through the line relay 16. This will cause said line relay to energize again before the connector has had time to release, and the relay 16, upon energizing, will close the circuit of the relay 26, which in turn will cause the winding 49 of the switch C to energize. This will break the energizing circuit of the connector line relay again and the entire operation will be repeated over and over without releasing the connection until the called subscriber hangs up his receiver. As shown herein, however, the relay 26 of the connector, upon deënergizing, would open the circuit of the relay 18 at the same time that the circuit of the winding 49 was opened, so that the connections between the line and the battery through the connector relay 16 would be restored to their normal direction by the time the battery was restored to the line at the switch C, and therefore the same terminal of the battery would be connected to either side of the line in both the switch C and the connector H, and the connector line relay would not be energized again, but would permit the connector to release in the usual manner.

While I have illustrated my invention in connection with a particular type of automatic telephone system, it will, of course, be understood that the features of my invention are capable of broader use and that my invention contemplates the use of the various novel features of my invention in connection with an automatic system of any known type, or in connection with a semi-automatic system.

What I claim as my invention is:—

1. In a telephone system, a calling and a called subscriber's line, a line relay individual to each line, means for extending a connection between the calling and the called subscribers' lines, means for disconnecting said relay from the called line, and means whereby the connection between the calling and the called lines is not completed until a predetermined interval after the line relay has been disconnected from the called line.

2. In a telephone system, a calling and a called subscriber's line, a non-numerical line switch individual to each subscriber's line, a line relay for each switch normally connected with the subscriber's line, means for disconnecting said relay from the line when said line is a called line, means for extending a connection between the calling and the called subscribers' lines, and means whereby the connection is not completed until a predetermined interval after the line relay has been disconnected from the called line.

3. In a telephone system, a calling and a called subscriber's line, a line relay individual to each line, means including automatic switches controllable over two sides of a line circuit in series for extending a connection between the calling and the called subscribers' lines, means for disconnecting said relay from its line when said line is a called line, and means whereby the connection between the calling and the called lines is not completed until a predetermined interval after the line relay has been disconnected from the called line.

4. In a telephone system, a calling and a called subscriber's line, a non-numerical line switch individual to each subscriber's line, a line relay for each switch normally connected with the subscriber's line, means for disconnecting said relay from the line when said line is a called line, means including automatic switches controllable over two sides of a line circuit in series for extending a connection between the calling and the called subscribers' lines, and means whereby the connection is not completed until a predetermined interval after the line relay has been disconnected from the called line.

5. In a telephone system, a calling and a called subscriber's line, means including an automatic connector switch for establishing a connection between said lines, a side switch in said connector switch having a plurality of operative positions, means for moving said side switch into its final position after the impulses for the last digit of the called number have been transmitted, and means for completing the connection between the calling and the called lines at a predetermined interval after the side switch has passed to its final position.

6. In a telephone system, a calling and a called subscriber's line, means including an automatic connector switch for establishing a connection between said lines, a side switch in said connector switch having a plurality of operative positions, means for moving said side switch into its final position after the impulses for the last digit of the called number have been transmitted, means for completing the connection between the calling and the called lines at a predetermined interval after the side switch has passed to its final position, and means for controlling the operation of said connector switch over two sides of the line circuit in series.

7. In a telephone system, a calling and a called subscriber's line, means including a connector switch for establishing a connection between said lines, a side switch for said connector switch having a plurality of operative positions, a private magnet for controlling the operation of said side switch, a relay connected in parallel with said private magnet, and means controlled by said relay for completing the connection with the called line.

8. In a telephone system, a calling and a called subscriber's line, means including a connector switch for establishing a connection between said lines, a side switch for said connector switch having a plurality of operating positions, a private magnet for controlling the operation of said side switch, a slow acting relay connected in parallel with said private magnet, means controlled by said slow acting relay for completing the connection with the called line at a predetermined interval after the side switch has moved to its final position, and means for controlling the operation of said connector switch over two sides of the line circuit in series.

9. In a telephone system, subscribers' lines divided into groups, a line relay individual to each line, means for extending a connection between the calling and the called subscribers' lines, said means including an automatic switch having motion in one plane to select groups and motion in a plane at right-angles thereto to find a line in a selected group, means for disconnecting said relay from the called line, and means whereby the connection between the calling and the called lines is not completed until a predetermined interval after the line relay has been disconnected from the called line.

10. In a telephone system, subscribers' lines divided into groups, a non-numerical line switch individual to each subscriber's line, a line relay for each switch normally connected with the subscriber's line, means for disconnecting said relay from the line when said line is a called line, means for extending a connection between the calling and the called subscribers' lines, said means including an automatic switch having motion in one plane to select groups and motion in a plane at right-angles thereto to find a line in the selected group, and means whereby the connection is not completed until a predetermined interval after the line relay has been disconnected from the called line.

11. In a telephone system, subscribers' lines divided into groups, a line relay individual to each line, means including automatic switches controllable over two sides of a line circuit in series for extending a connection between the calling and the called subscribers' lines, said automatic switches having motion in one plane to select groups and motion in a plane at right-angles thereto to find a line in a selected group, means for disconnecting said relay from its line when said line is a called line, and means whereby the connection between the calling and the called lines is not completed until a predetermined interval after the line relay has been disconnected from the called line.

12. In a telephone system, subscribers' lines divided into groups, a non-numerical line switch individual to each subscriber's line, a line relay for each switch normally connected with the subscriber's line, means for disconnecting said relay from the line when said line is a called line, means including automatic switches controllable over two sides of a line circuit in series for extending a connection between the calling and the called subscribers' lines, said automatic switches having motion in one plane to select groups and motion in a plane at right-angles thereto to find a line in a selected group, and means whereby the connection is not completed until a predetermined interval after the line relay has been disconnected from the called line.

13. In a telephone system, subscribers' lines divided into groups, means including an automatic connector switch for establishing a connection between said lines, said connector switch having motion in one plane to select groups and motion in a plane at right-angles thereto to find a line in a selected group, a side switch in said connector switch having a plurality of operative positions, means for moving said side switch into its final position after the impulses for the last digit of the called number have been transmitted, and means for completing the connection between the calling and the called lines at a predetermined interval after the side switch has passed to its final position.

14. In a telephone system, subscribers' lines divided into groups, means including an automatic connector switch for establishing a connection between said lines, said connector switch having motion in one plane to select groups and motion in a plane at right-angles thereto to find a line in a selected group, a side switch in said connector switch having a plurality of operative positions, means for moving said side switch into its final position after the impulses for the last digit of the called number have been transmitted, means for completing the connection between the calling and the called lines at a predetermined interval after the side switch has passed to its final position, and means for controlling the operation of said connector switch over two sides of the line circuit in series.

15. In a telephone system, subscribers' lines divided into groups, means including a connector switch for establishing a connection between said lines, said connector switch having motion in one plane to select groups and motion in a plane at right-angles thereto to find a line in a selected group, a side switch for said connector switch having a plurality of operative positions, a private magnet for controlling the operation of said side switch, a relay connected in parallel with said private magnet, and means controlled by said relay for completing the connection with the called line.

16. In a telephone system, subscribers' lines divided into groups, means including a connector switch for establishing a connection between said lines, said connector switch having motion in one plane to select groups and motion in a plane at right-angles thereto to find a line in a selected group, a side switch for said connector switch having a plurality of operative positions, a private magnet for controlling the operation of said side switch, a slow acting relay connected in parallel with said private magnet, means controlled by said slow acting relay for completing the connection with the called line at a predetermined interval after the side switch has moved to its final position, and means for controlling the operation of said connector switch over two sides of the line circuit in series.

17. In a telephone system, a calling and a called subscriber's line, means including an automatic switch for establishing a connection between said lines, a back-bridge relay for said switch, means for deënergizing said relay by hanging up the receiver at the calling substation, and means controlled by the deënergization of said relay for reversing the battery connection to the calling line.

18. In a telephone system, a calling and a called subscriber's line, means including a connector switch for establishing a connection between said lines, means for controlling the operation of said switch over two sides of a line circuit in series, a back-bridge relay for said connector, and means for deënergizing said back-bridge relay upon hanging up the receiver at the calling station.

19. In a telephone system, subscribers' lines divided into groups, means including an automatic switch for establishing a connection between said lines, said automatic switch having motion in one plane to select groups and motion in a plane at right-angles thereto to find a line in a selected group, a back-bridge relay for said switch, means for deënergizing said relay by hanging up the receiver at the calling substation, and means controlled by the deënergization of said relay for reversing the battery connection to the calling line.

20. In a telephone system, subscribers' lines divided into groups, means including a connector switch for establishing a connection between said lines, said connector switch having motion in one plane to select groups and motion in a plane at right-angles thereto to find a line in a selected group, means for controlling the operation of said switch over two sides of a line circuit in series, a back-bridge relay for said connector, and means for deënergizing said back-bridge relay upon hanging up the receiver at the calling station.

21. In a telephone system, a calling and a called subscriber's line, means including a connector switch for establishing a connection between said lines, means for controlling the operation of said switch over two sides of a line circuit in series, a back-bridge relay for said connector, means for deënergizing said back-bridge relay upon hanging up the receiver at the calling station, and means controlled by the deënergization of said relay for reversing the battery connection to the calling line.

22. In a telephone system, a calling and a called subscriber's line, means including an automatic switch for establishing a connection between said lines, a release relay, a back-bridge relay connected to ground through springs controlled by said release relay, means for deënergizing said back-bridge relay by hanging up the receiver at the calling substation, and means controlled by said deënergization for reversing the battery connection to the calling line.

23. In a telephone system, a calling and a called subscriber's line, means including an automatic connector switch for establishing a talking connection between said lines, a pair of condensers in the talking conductors, a relay bridged across the talking conductors on the called side of said condensers, a release relay for said connector, means controlled by said release relay for controlling the circuit of the bridged relay, and means for deënergizing said bridged relay when the calling subscriber replaces his receiver upon the hook.

24. In a telephone system, a calling and a called subscriber's line, means including an automatic connector switch for establishing a connection between said lines, a pair of condensers in opposite sides of said talking connection, a back-bridge relay bridged across the talking conductors at the called side of said condensers, a release relay, means controlled by said release relay for controlling the circuit of said back-bridge relay, means controlled by the calling subscriber for deënerigizing said release relay to thereby deënergize said back-bridge relay, and means controlled by the deënergization of said back-bridge relay for reversing the battery connection to the calling line.

25. In a telephone system, a calling and a called subscriber's line, a line switch for said calling line, a line relay for said switch normally connected with said line and with battery, a cut-off relay for cutting off said line relay during a connection, means including a connector switch for extending a connection from said line switch to a called subscriber's line, means controlled by the calling subscriber in releasing for deënergizing said cut-off relay to again connect said line relay and battery to the calling line, and means operated at the same time for reversing the battery connections to the calling line at the connector and thereby prevent said line relay from energizing.

26. In a telephone system, a calling and a called subscriber's line, a line switch for said calling line including a line relay normally connected with the line and a cut-off relay for disconnecting said line relay during the time a connection is established with the called line, means including a connector switch for extending a connection from said line switch to the called line, a relay bridged across the called end of said connector, a release relay controlling the circuit of said bridged relay, means controlled by the calling subscriber in releasing for deënergizing said release relay, circuit connections whereby the deënergization of said release relay deënergizes said cut-off relay and said bridged relay, and means controlled by the deënergization of said bridged relay for reversing the battery connections to the calling line to thereby prevent said line relay from energizing.

27. In a telephone system, subscribers' lines divided into groups, means including a connector switch for establishing a connection between said lines, said connector switch having motion in one plane to select groups and motion in a plane at right-angles thereto to find a line in a selected group, means for controlling the operation of said switch over two sides of a line circuit in series, a back-bridge relay for said connector, means for deënergizing said back-bridge relay upon hanging up the receiver at the calling station, and means controlled by the deënergization of said relay for reversing the battery connection to the calling line.

28. In a telephone system, subscribers' lines divided into groups, means including an automatic switch for establishing a connection between said lines, said automatic switch having motion in one plane to select groups and motion in a plane at right-angles thereto to find a line in a selected group, a release relay, a back-bridge relay connected to ground through springs controlled by said release relay, means for deënergizing said back-bridge relay by hanging up the receiver at the calling substantion, and means controlled by said deënergization for reversing the battery connection to the calling line.

29. In a telephone system, subscribers' lines divided into groups, means including an automatic connector switch for establishing a talking connection between said lines, said connector switch having motion in one plane to select groups and motion in a plane at right-angles thereto to find a line in a selected group, a pair of condensers in the talking conductors, a relay bridged across the talking conductors on the called side of said condensers, a release relay for said connector, means controlled by said release relay for controlling the circuit of the bridged relay, and means for deënergizing said bridged relay when the calling subscriber replaces his receiver upon the hook.

30. In a telephone system, subscribers' lines divided into groups, means including an automatic connector switch for establishing a connection between said lines, said connector switch having motion in one plane to select groups and motion in a plane at right-angles thereto to find a line in a selected group, a pair of condensers in opposite sides of said talking connection, a back-bridge relay bridged across the talking conductors at the called side of said condensers, a release relay, means controlled by said release relay for controlling the circuit of said back-bridge relay, means controlled by the calling subscriber for deenergizing said release relay to thereby deenergize said back-bridge relay, and means controlled by the deënergization of said back-bridge relay for reversing the battery connection to the calling line.

31. In a telephone system, subscribers' lines divided into groups, a line switch for said calling line, a line relay for said switch normally connected with said line and with battery, a cut-off relay for cutting off said line relay during a connection, means including a connector switch for extending a connection from said line switch to a called subscriber's line, said connector switch having motion in one plane to select groups and motion in a plane at right-angles thereto to find a line in a selected group, means controlled by the calling subscriber in releasing for deënergizing said cut-off relay to again connect said line relay and battery to the calling line, and means operated at the same time for reversing the battery connections to the calling line at the connector and thereby prevent said line relay from energizing.

32. In a telephone system, subscribers' lines divided into groups, a line switch for said calling line including a line relay normally connected with the line and a cut-off relay for disconnecting said line relay during the time a connection is established with the called line, means including a connector switch for extending a connection from said line switch to the called line, said connector switch having motion in one plane to select groups and motion in a plane at right-angles thereto to find a line in a selected group, a relay bridged across the called end of said connector, a release relay controlling the circuit of said bridged relay, means controlled by the calling subscriber in releasing for deënergizing said release relay, circuit connections whereby the deenergization of said release relay deënergizes said cut-off relay and said bridged relay, and means controlled by the deënergization of said bridged relay for reversing the battery connections to the calling line to thereby prevent said line relay from energizing.

33. In a telephone system, a line, normal conductors permanently connected therewith, a connector switch for connecting with said line through said normal conductors, means including a line relay for said line for extending a connection therefrom, means for disconnecting said relay from said line when said line is called, means for applying ringing current to said line, and means for preventing ringing current being projected over said line before said relay has been disconnected.

34. In a telephone system, a line, normal conductors permanently connected therewith, a connector switch for connecting with said line through said normal conductors, a line switch individual to said line for extending a connection therefrom and having a line relay normally connected to said line, means for disconnecting said relay from said line when said line is called, means for applying ringing current to said line, and means for preventing ringing current being projected over said line before said relay has been disconnected.

Signed by me at Chicago, Cook county, Illinois, this 18th day of August, 1914.

FRANK NEWFORTH, Jr.

Witnesses:

Geo. A. Yanochowski,

Chas. M. Candy.